US006983472B2

(12) United States Patent
Ito

(10) Patent No.: US 6,983,472 B2
(45) Date of Patent: Jan. 3, 2006

(54) OPTICAL PICKUP

(75) Inventor: Tatsuya Ito, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 516 days.

(21) Appl. No.: 10/212,116

(22) Filed: Aug. 6, 2002

(65) Prior Publication Data

US 2003/0035358 A1 Feb. 20, 2003

(30) Foreign Application Priority Data

Aug. 17, 2001 (JP) ............................ P2001-247574

(51) Int. Cl.
G11B 33/14 (2006.01)
G11B 7/00 (2006.01)
(52) U.S. Cl. .................. 720/648; 369/112.01
(58) Field of Classification Search ............... 720/685, 720/683; 369/112.01, 244.1, 219.1, 247.1, 369/112.1; 359/814, 824
See application file for complete search history.

(56) References Cited

U.S. PATENT DOCUMENTS 5,109,368 A * 4/1992 Ohta et al. ............... 369/44.14
5,323,378 A * 6/1994 Kim et al. .................. 720/684
6,463,019 B2 * 10/2002 Kawano et al. .......... 369/44.14
2003/0123374 A1 * 7/2003 Matsumura et al. ........ 369/215
2003/0161251 A1 * 8/2003 Shimada et al. ............ 369/244
2004/0076107 A1 * 4/2004 Sogawa et al. ............. 369/244
2004/0114496 A1 * 6/2004 Sogawa et al. ............. 369/120

FOREIGN PATENT DOCUMENTS

JP          8-007321        1/1996

* cited by examiner

Primary Examiner—Allen Cao
(74) Attorney, Agent, or Firm—Morgan, Lewis & Bockius LLP

(57) ABSTRACT

A circuit board body 6a of a printed circuit board 6 provided on an outer peripheral surface of a pickup body 1 made of a synthetic resin is formed of a metal plate, an extension 19 extending integrally from a metallic supporting baseplate 8 of a semiconductor laser LD is inserted in a groove 20 formed in the outer peripheral surface of the pickup body 1. The circuit board body 6a is secured to the pickup body 1 by a screw 7 and a projection 15 to allow the circuit board body 6a to be held in close contact with the extension 19 and the outer peripheral surface of the pickup body 1.

3 Claims, 5 Drawing Sheets

OPTICAL PICKUP

BACKGROUND OF THE INVENTION

1. Field of the Invention

The present invention relates to an optical pickup for use in a disk player such as a DVD, and more particularly to an optical pickup which exhibits high performance and is inexpensive, and in which a read error is prevented from occurring.

2. Description of the Related Art

As techniques of an optical pickup, those disclosed in JP-A-8-7321 and the like are known, and one example of it will be described with reference to FIG. 6. In this optical pickup, a photodiode PD is disposed at an opening 3a in one end of a light passage hole 3 with a half mirror 2 in a pickup body 1, while a collimator lens QWP and an objective lens OL are disposed at an opening 3b in the other end thereof. A semiconductor laser LD is accommodated in a branching hole 4 formed in a side surface of the pickup body 1, and a printed circuit board 6 connected to the photodiode PD and the semiconductor laser LD by means of flexible cables 5 is secured to an outer peripheral surface of the pickup body 1 by means of a screw 7. It should be noted that reference numeral 8 denotes a supporting baseplate of the semiconductor laser LD, and reference numeral 9 denotes a connector secured to the printed circuit board 6. As a plug 10 is connected to the connector 9, the photodiode PD and the semiconductor laser LD are connected to a control unit of a microcomputer or the like.

In the above-described configuration, laser light is projected from the semiconductor laser LD onto a disk D via the half mirror 2, the collimator lens QWP, and the objective lens OL, and the reflected light is received by the photodiode PD through the half mirror 2, thereby making it possible to read information recorded on the disk D.

The problem encountered here is that the semiconductor laser LD generates heat due to the projection of the laser light, resulting in a decline its capability. Accordingly, the pickup body 1 is conventionally formed by aluminum die casting to promote the dissipation of heat, but the aluminum die-cast pickup body 1 is expensive.

Accordingly, it has been conceived to form the pickup body 1 of an inexpensive hard synthetic resin and to use a metal plate for the supporting baseplate 8 of the semiconductor laser LD, so as to promote the dissipation of heat.

In the above-described configuration, the arrangement provided is such that the dissipation of heat is promoted by the metallic supporting baseplate 8 of the semiconductor laser LD. If the supporting baseplate 8 is made large to enhance the heat dissipation effect, the supporting baseplate 8 becomes bulky and comes into contact with peripheral devices, so that there is a limit to making it large. If a high-performance device is used as the semiconductor laser LD, the amount of heat generated is large, so that the pickup body 1 becomes thermally expanded and deformed (see the phantom line in FIG. 6). Hence, there is a possibility that an optical axis O connecting the photodiode PD and the objective lens OL may become curved, possibly resulting in the occurrence of a read error. Accordingly, as the semiconductor laser LD, it is inevitable to use one which generates a small amount of heat, with the result that the range of selection is bound to be narrow.

SUMMARY OF THE INVENTION

In view of the above-described drawbacks of the conventional art, the object of the invention is to provide an optical pickup which exhibits high performance and is inexpensive, and in which a read error is prevented from occurring.

To attain the above object, in accordance with the invention according to a first aspect, there is provided an optical pickup including a pickup body made of a synthetic resin, the pickup body having a light passage hole, first and second openings formed in both ends thereof, and a groove formed in an outer peripheral surface thereof; a photodiode disposed at the first opening; a half mirror disposed in the light passage hole; a collimator lens disposed at the second opening; an objective lens disposed at the second opening side; a semiconductor laser accommodated at a position opposing the half mirror in the light passage hole; a metallic supporting base plate on which the semiconductor laser is mounted, the metallic supporting base plate having an extension; a printed circuit board disposed on the outer peripheral surface of the pickup body, the printed circuit board having a circuit board body; and a plurality of cables for connecting the printed circuit board to the photodiode and the semiconductor laser respectively, wherein laser light is projected from the semiconductor laser onto a disk via the half mirror, the collimator lens, and the objective lens, and the reflected light is received by the photodiode through the half mirror so as to read information recorded on the disk, wherein the extension extends integrally from the metallic supporting base plate and is inserted in the groove, and wherein the circuit board body comprises a metal plate, the circuit board body is secured to the pickup body to bring the circuit board body in close contact with the extension and the outer peripheral surface of the pickup body.

According to the above-described construction, since the arrangement provided is such that the heat transmitted to the synthetic resin-made pickup body is actively radiated to the atmosphere through the metallic circuit board body of the printed circuit board, there is no risk of the pickup body becoming thermally expanded and deformed due to the heat generated by the semiconductor laser, and an optical axis connecting the photodiode and the objective lens can be maintained straightly, as required, thereby making it possible to prevent the occurrence of a read error.

In addition, since the circuit board body of the printed circuit board and the metallic supporting baseplate of the semiconductor laser are in close contact with each other through the extension, it is possible to enlarge the heat dissipation area without enlarging the supporting baseplate. As a result, it becomes possible to use even a high-performance semiconductor laser which generates a large amount of heat, thereby making it possible to enlarge the range of selection of the semiconductor laser. Hence, it is possible to manufacture an inexpensive and high-accuracy optical pickup.

In accordance with the invention according to a second aspect, there is provided an optical pickup including a pickup body made of a synthetic resin, the pickup body having a light passage hole, first and second openings formed in both ends thereof; a photodiode disposed at the first opening; a half mirror disposed in the light passage hole; a collimator lens disposed at the second opening; an objective lens disposed at the second opening side; a semiconductor laser accommodated at a position opposing the half mirror in the light passage hole; a printed circuit board disposed on the outer peripheral surface of the pickup body, the printed circuit board having a circuit board body; and a plurality of cables for connecting the printed circuit board to the photodiode and the semiconductor laser respectively, wherein laser light is projected from the semiconductor laser onto a disk via the half mirror, the collimator lens, and the objective lens, and the reflected light is received by the photodiode through the half mirror so as to read information recorded on the disk, and wherein the circuit board body comprises a metal plate.

According to the above-described construction, since the arrangement provided is such that the heat transmitted to the synthetic resin-made pickup body is actively radiated to the atmosphere through the metallic circuit board body of the printed circuit board, there is no risk of the pickup body becoming thermally expanded and deformed due to the heat generated by the semiconductor laser, and an optical axis connecting the photodiode and the objective lens can be maintained straightly, as required, thereby making it possible to prevent the occurrence of a read error. Hence, it is possible to manufacture an inexpensive and high-accuracy optical pickup.

The invention according to a third aspect, the circuit board body and a metallic supporting baseplate of the semiconductor laser are in contact with each other.

According to the above-described construction, since the metallic circuit board body of the printed circuit board and the metallic supporting baseplate of the semiconductor laser are in close contact with each other, it is possible to enlarge the heat dissipation area without enlarging the supporting baseplate. As a result, it becomes possible to use even a high-performance semiconductor laser which generates a large amount of heat, thereby making it possible to enlarge the range of selection of the semiconductor laser.

The invention according to a fourth aspect, an extension extending integrally from the metallic supporting baseplate is inserted in a groove formed in the outer peripheral surface of the pickup body, and that the circuit board body is secured to the pickup body to allow the circuit board body to be held in close contact with the outer peripheral surface of the pickup body.

According to the above-described construction, since the metallic circuit board body of the printed circuit board and the metallic supporting baseplate of the semiconductor laser are in close contact with each other through the extension, it is possible to enlarge the heat dissipation area without enlarging the supporting baseplate. As a result, it becomes possible to use even a high-performance semiconductor laser which generates a large amount of heat, there by making it possible to enlarge the range of selection of the semiconductor laser. In addition, since the circuit boardbody of the printed circuit board is in close contact with the outer peripheral surface of the pickup body, the heat of the pickup body can be actively radiated.

DETAILED DESCRIPTION OF THE PREFERRED EMBODIMENTS

Figure 1:
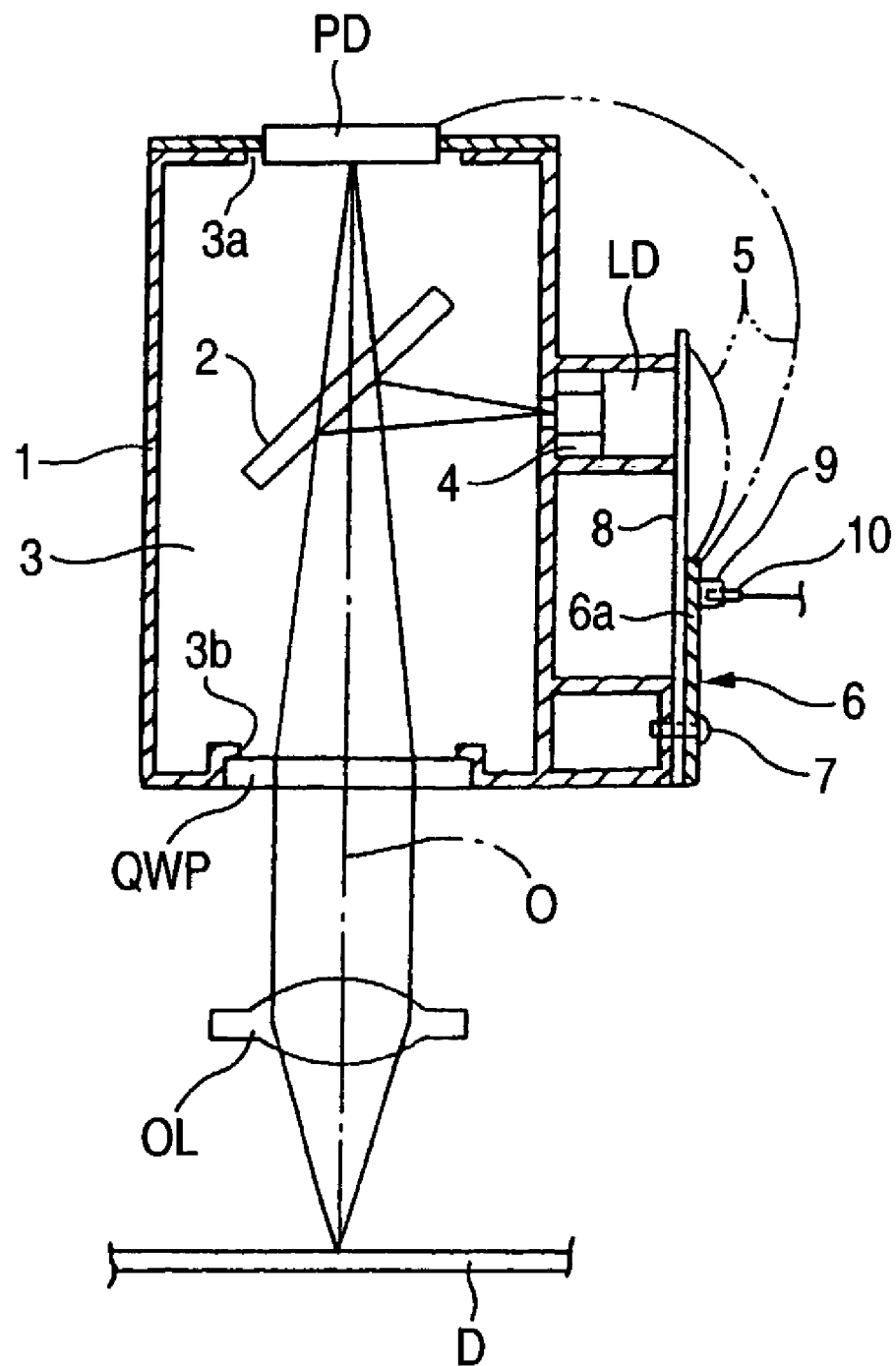
FIG. 1 is a schematic vertical sectional view illustrating the principle of an optical pickup in accordance with an embodiment of the invention.
Figure 2:
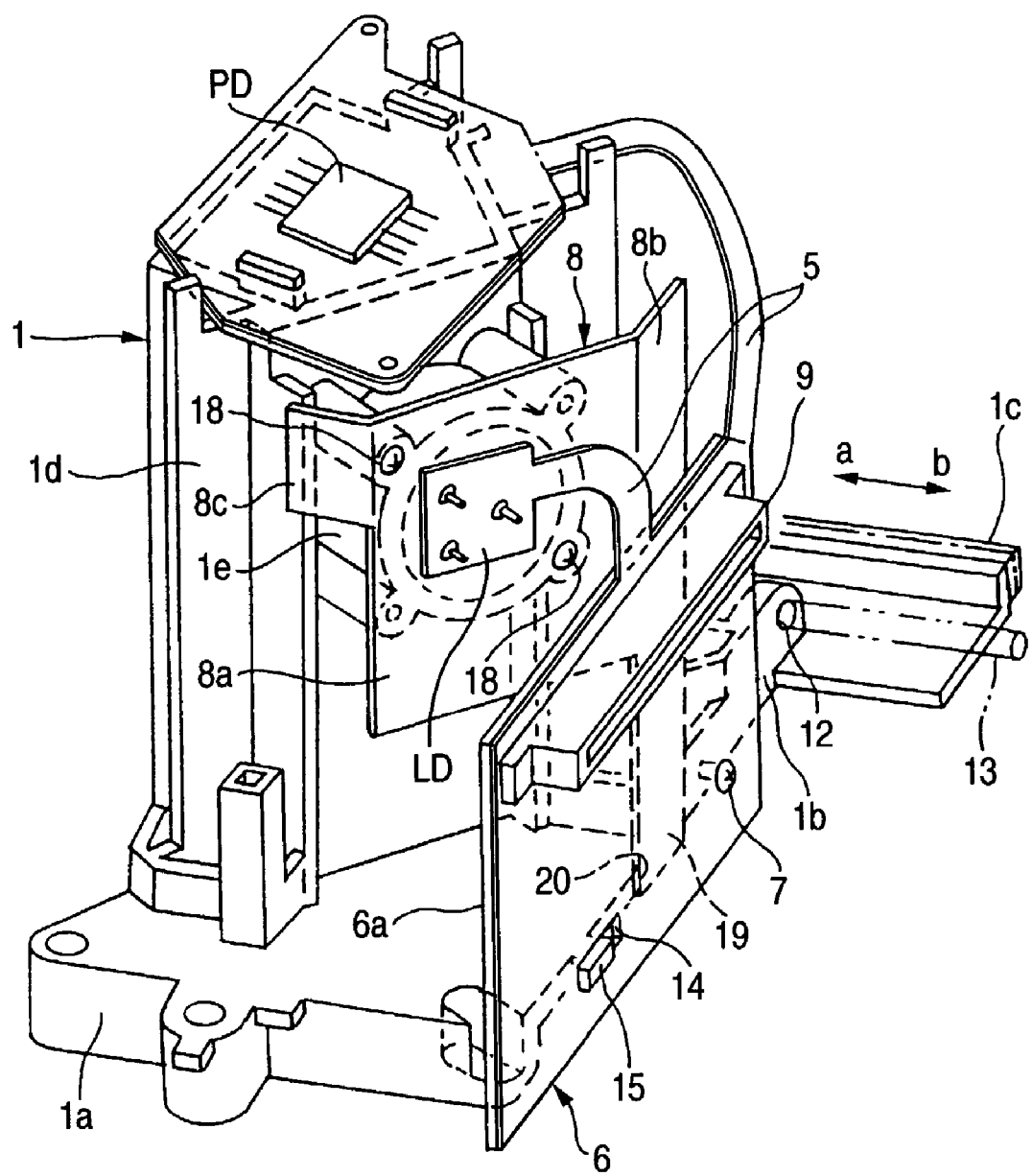
FIG. 2 is a perspective view of the optical pickup.
Figure 3:
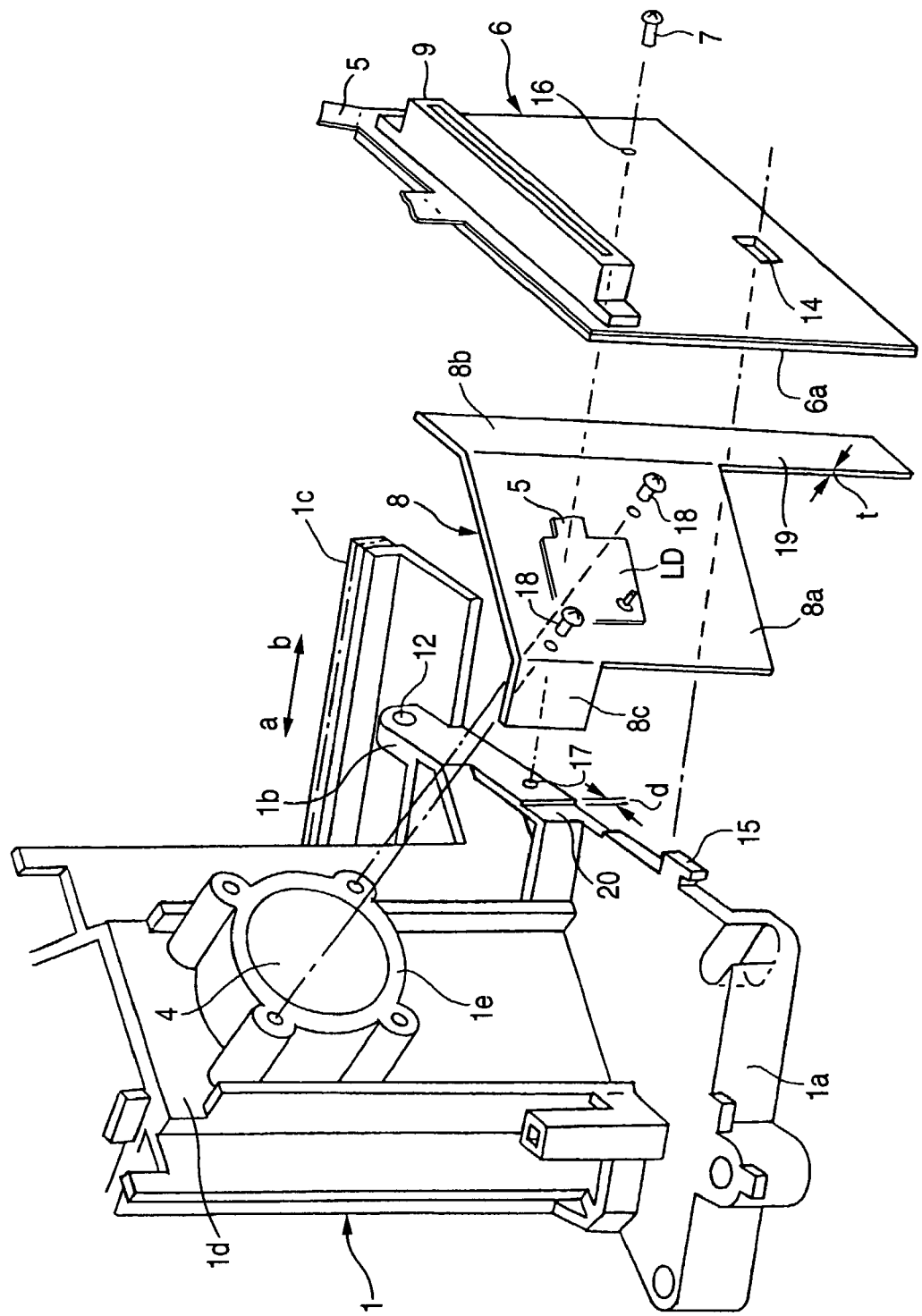
FIG. 3 is an exploded perspective view thereof.
Figure 4:
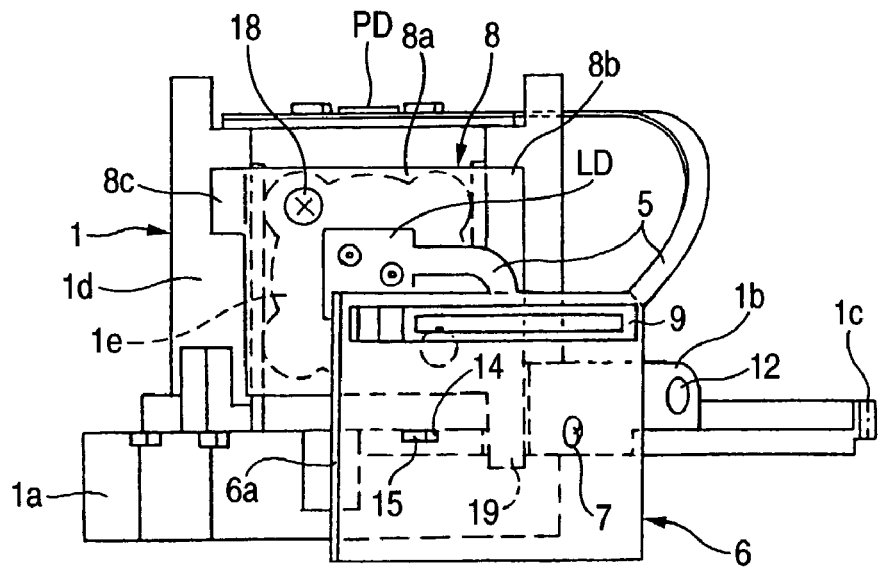
FIG. 4 is a front elevational view of the optical pickup.
Figure 5:
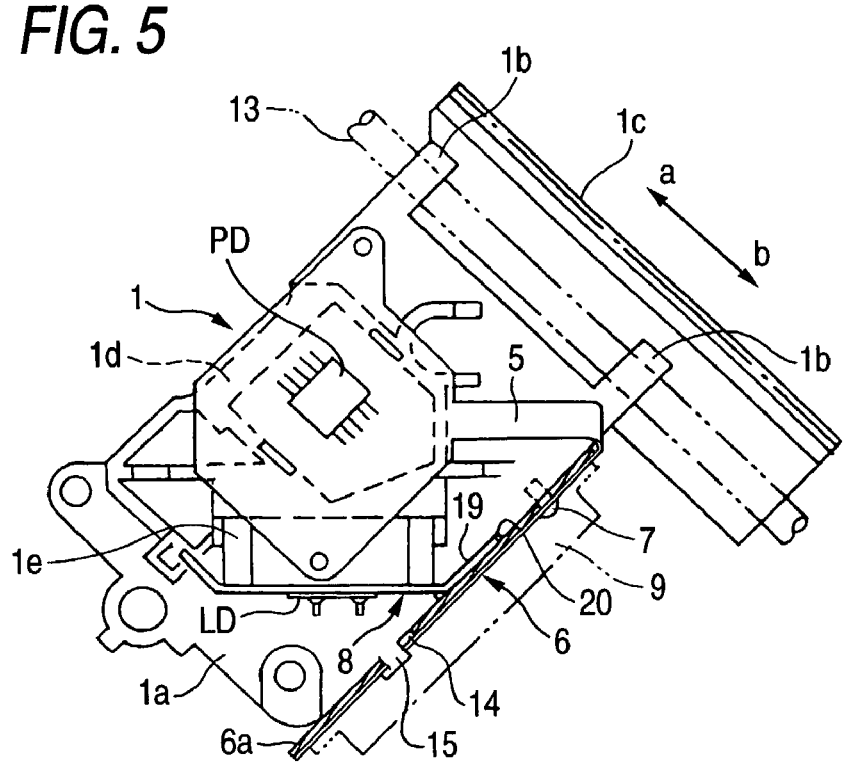
FIG. 5 is a plan view of the optical pickup.
Figure 6:
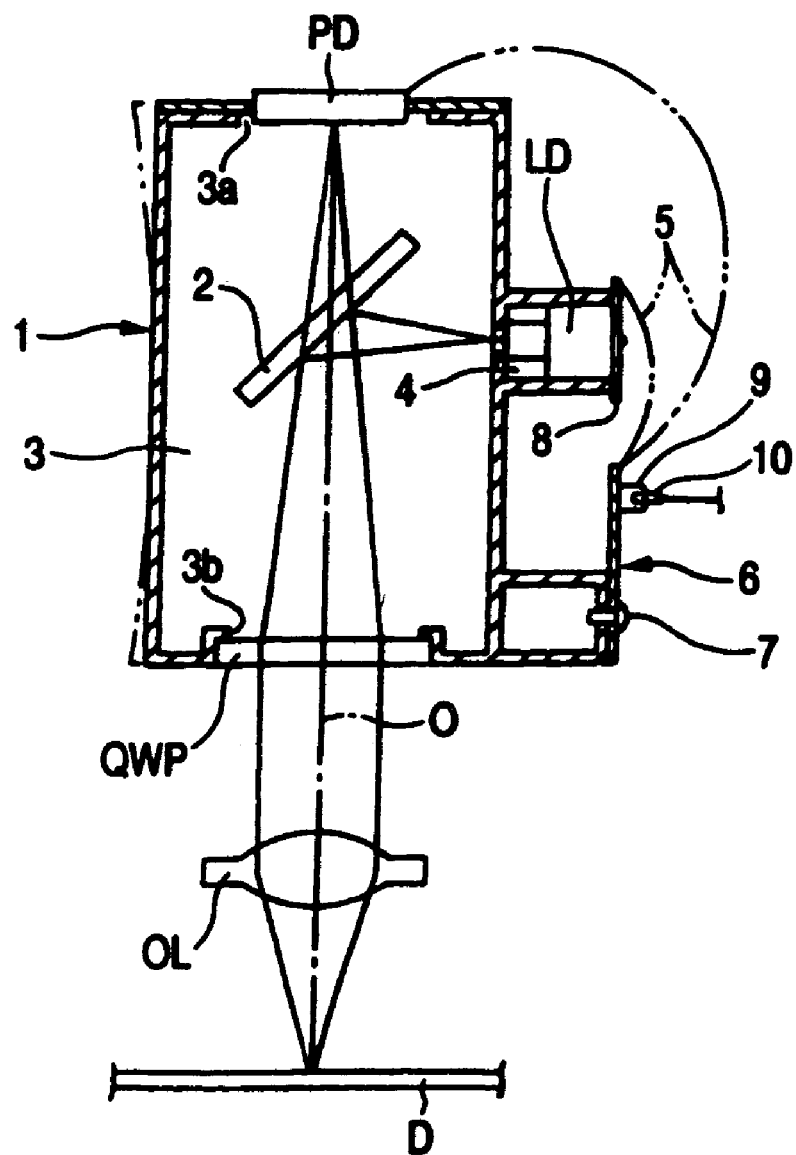
FIG. 6 is a schematic vertical sectional view illustrating a conventional example.

FIG. 1 illustrates the principle of an optical pickup in accordance with an embodiment of the invention, in which a circuit board body 6a of a printed circuit board 6 secured to an outer peripheral surface of the pickup body 1 by means of a screw 7 is formed of a metal plate, and the circuit board body 6a and a metallic supporting baseplate 8 are in contact with each other. Since the arrangements other than the above-described arrangement are substantially similar to those shown in FIG. 6, the same portions will be denoted by the same reference numerals, and a description thereof will be omitted.

As shown in FIGS. 2 to 5, the pickup body 1, which is formed of a hard synthetic resin, has a base frame portion 1a which is substantially rectangular in a plan view, as well as a pair of brackets 1b and a rack 1c which are integrally provided projectingly on a side surface of the base frame portion 1a. As a guide rod 13 is movably fitted in through holes 12 of both brackets 1b, and a pinion (not shown) meshing with the rack 1c is forwardly or reversely rotated, the pickup body 1 can be moved in the directions of arrows a and b along the guide rod 13.

In addition, a photodiode PD is disposed at an upper end of a main cylinder portion 1d provided projectingly on the base frame portion 1a, and the semiconductor laser LD is disposed on a branching cylindrical portion 1e provided projectingly on the side surface of the main cylinder portion 1d.

The circuit board body 6a of the printed circuit board 6 is formed of a substantially rectangular metal plate such as a aluminum plate. The circuit board body 6a is secured to an outer peripheral surface of the pickup body 1 as an engaging hole 14 provided in its lower portion is engaged with a substantially L-shaped projection 15 provided projectingly on the base frame portion 1a, and the screw 7 is passed through a through hole 16 provided in its lower portion and is screwed into a threaded hole 17 in the base frame portion 1a.

According to the above-described construction, since the arrangement provided is such that the heat transmitted to the synthetic resin-made pickup body 1 is actively radiated to the atmosphere through the metallic circuit board body 6a, there is no risk of the pickup body 1 becoming thermally expanded and deformed due to the heat generated by the semiconductor laser LD, and an optical axis O connecting the photodiode PD and an objective lens OL can be maintained straightly, thereby making it possible to prevent the occurrence of a read error. Hence, it is possible to manufacture an inexpensive and high-accuracy optical pickup.

The metallic supporting baseplate 8 of the semiconductor laser LD is formed of a metal plate such as aluminum plate bent substantially in a U-shape in a plan view, and includes a central plate portion 8a secured to an end face of the branching cylindrical portion 1e by screws 18, as well as side plate portions 8b and 8c which are bent from both side edges of the central plate portion 8a toward the pickup body 1 side. The thickness t of an extension 19 extending integrally from the side plate portion 8b is set to be identical to or slightly larger than the depth d of a U-groove 20 formed in a side surface of the base frame portion 1a in such a manner as to oppose the extension 19. As the extension 19 is inserted in the U-groove 20, and the circuit board body 6a is secured to the side surface of the base frame portion 1a, the circuit board body 6a is in close contact with the extension 19 and the base frame portion 1a.

According to the above-described construction, since the metallic circuit board body 6a of the printed circuit board 6 and the metallic supporting baseplate 8 of the semiconductor laser LD are in close contact with each other through the extension 19, it is possible to enlarge the heat dissipation area without enlarging the supporting baseplate 8. As a result, it becomes possible to use even a high-performance semiconductor laser LD which generates a large amount of heat, thereby making it possible to enlarge the range of selection of the semiconductor laser LD. In addition, since the metallic circuit board body 6a is in close contact with the side surface of the base frame portion 1a, the heat of the pick up body 1 can be actively radiated.

In accordance with the invention according to the first aspect, since the arrangement provided is such that the heat transmitted to the synthetic resin-made pickup body is actively radiated to the atmosphere through the metallic circuit board body of the printed circuit board, there is no risk of the pickup body becoming thermally expanded and deformed due to the heat generated by the semiconductor laser, and an optical axis connecting the photodiode and the objective lens can be maintained straightly, as required, in the same way as the conventional metallic pickup body, thereby making it possible to prevent the occurrence of a read error.

In addition, since the circuit board body of the printed circuit board and the metallic supporting baseplate of the semiconductor laser are in close contact with each other through the extension, it is possible to enlarge the heat dissipation area without enlarging the supporting baseplate. As a result, it becomes possible to use even a high-performance semiconductor laser which generates a large amount of heat, thereby making it possible to enlarge the range of selection of the semiconductor laser. Hence, it is possible to manufacture an inexpensive and high-accuracy optical pickup.

In accordance with the invention according to the second aspect, since the arrangement provided is such that the heat transmitted to the synthetic resin-made pickup body is actively radiated to the atmosphere through the metallic circuit board body of the printed circuit board, there is no risk of the pickup body becoming thermally expanded and deformed due to the heat generated by the semiconductor laser, and an optical axis connecting the photodiode and the objective lens can be maintained straightly, as required, in the same way as the conventional metallic pickup body, thereby making it possible to prevent the occurrence of a read error. Hence, it is possible to manufacture an inexpensive and high-accuracy optical pickup.

In accordance with the invention according to the third aspect, since the metallic circuit board body of the printed circuit board and the metallic supporting baseplate of the semiconductor laser are in close contact with each other, it is possible to enlarge the heat dissipation area without enlarging the supporting baseplate. As a result, it becomes possible to use even a high-performance semiconductor laser which generates a large amount of heat, there by making it possible to enlarge the range of selection of the semiconductor laser.

In accordance with the invention according to the fourth aspect, since the metallic circuit board body of the printed circuit board and the metallic supporting baseplate of the semiconductor laser are in close contact with each other through the extension, it is possible to enlarge the heat dissipation area without enlarging the supporting baseplate. As a result, it becomes possible to use even a high-performance semiconductor laser which generates a large amount of heat, thereby making it possible to enlarge the range of selection of the semiconductor laser. In addition, since the circuit board body of the printed circuit board is in close contact with the outer peripheral surface of the pickup body, the heat of the pickup body can be actively radiated.

What is claimed is:

1. An optical pickup comprising:
    a pickup body made of a synthetic resin, the pickup body having a light passage hole, first and second openings formed in both ends thereof, and a groove formed in an outer peripheral surface thereof;
    a photodiode disposed at the first opening;
    a half mirror disposed in the light passage hole;
    a collimator lens disposed at the second opening;
    an objective lens disposed at the second opening side;
    a semiconductor laser accommodated at a position opposing the half mirror in the light passage hole;
    a metallic supporting baseplate on which the semiconductor laser is mounted, the metallic supporting baseplate having an extension;
    a printed circuit board disposed on the outer peripheral surface of the pickup body, the printed circuit board having a circuit board body; and
    a plurality of cables for connecting the printed circuit board to the photodiode and the semiconductor laser respectively,
    wherein laser light is projected from the semiconductor laser onto a disk via the half mirror, the collimator lens, and the objective lens, and the reflected light is received by the photodiode through the half mirror so as to read information recorded on the disk,
    wherein the extension extends integrally from the metallic supporting baseplate and is inserted in the groove, and
    wherein the circuit board body comprises a metal plate, the circuit board body is secured to the pickup body to bring the circuit board body in close contact with the extension and the outer peripheral surface of the pickup body.

2. An optical pickup comprising:
    a pickup body made of a synthetic resin, the pickup body having a light passage hole, first and second openings formed in both ends thereof;
    a photodiode disposed at the first opening;
    a half mirror disposed in the light passage hole;
    a collimator lens disposed at the second opening;
    an objective lens disposed at the second opening side;
    a semiconductor laser accommodated at a position opposing the half mirror in the light passage hole;
    a metallic supporting baseplate on which the semiconductor laser is mounted;
    a printed circuit board disposed on the outer peripheral surface of the pickup body, the printed circuit board having a circuit board body; and
    a plurality of cables for connecting the printed circuit board to the photodiode and the semiconductor laser respectively,
    wherein laser light is projected from the semiconductor laser onto a disk via the half mirror, the collimator lens, and the objective lens, and the reflected light is received by the photodiode through the half mirror so as to read information recorded on the disk,
    wherein the circuit board body comprises a metal plate, and wherein a part of the metallic supporting base plate is sandwiched between the circuit board body and the pickup body whereby the metallic supporting baseplate is brought into contact with the circuit board body.

3. The optical pickup according to claim 2, wherein the pickup body includes a groove formed in an outer peripheral surface thereof, the metallic supporting baseplate includes an extension extending integrally from the metallic supporting baseplate, the extension is inserted in the groove, and wherein the circuit board body is secured to the pickup body to bring the circuit board body in close contact with the extension and the outer peripheral surface of the pickup body.

\* \* \* \* \*